United States Patent
Norton et al.

(10) Patent No.: US 9,960,432 B2
(45) Date of Patent: May 1, 2018

(54) ADJUSTABLE BATTERY STACK AND METHOD OF USE IN DEVICE ENCLOSURE

(71) Applicant: Medtronic, Inc., Minneapolis, MN (US)

(72) Inventors: John D. Norton, Saint Paul, MN (US); Craig L. Schmidt, Eagan, MN (US)

(73) Assignee: Medtronic, Inc., Minneapolis, MN (US)

(*) Notice: Subject to any disclaimer, the term of this patent is extended or adjusted under 35 U.S.C. 154(b) by 362 days.

(21) Appl. No.: 14/669,158

(22) Filed: Mar. 26, 2015

(65) Prior Publication Data
US 2016/0285111 A1 Sep. 29, 2016

(51) Int. Cl.
| | | |
|---|---|---|
| H01M 6/42 | (2006.01) | |
| H01M 2/02 | (2006.01) | |
| H01M 2/16 | (2006.01) | |
| H01M 2/10 | (2006.01) | |
| H01M 10/04 | (2006.01) | |
| H01M 10/42 | (2006.01) | |

(52) U.S. Cl.
CPC ........... *H01M 6/42* (2013.01); *H01M 2/0257* (2013.01); *H01M 2/1033* (2013.01); *H01M 2/1066* (2013.01); *H01M 2/16* (2013.01); *H01M 6/425* (2013.01); *H01M 10/0436* (2013.01); *H01M 10/0445* (2013.01); *H01M 10/425* (2013.01)

(58) Field of Classification Search
None
See application file for complete search history.

(56) References Cited

U.S. PATENT DOCUMENTS

| | | | |
|---|---|---|---|
| 4,317,869 A | 3/1982 | Folus | |
| 5,614,331 A * | 3/1997 | Takeuchi | H01M 6/425 |
| | | | 429/153 |
| 7,209,784 B2 | 4/2007 | Schmidt | |
| 8,614,017 B2 | 12/2013 | Viavattine | |
| 2004/0064163 A1 | 4/2004 | Aamodt et al. | |
| 2009/0208831 A1 | 8/2009 | Tanino | |
| 2013/0008731 A1 | 1/2013 | Hofmann | |

FOREIGN PATENT DOCUMENTS

EP    780918 A1    6/1997

OTHER PUBLICATIONS (PCT/US2016/023531) PCT Notification of Transmittal of the International Search Report and the Written Opinion of the International Searching Authority, dated Jun. 6, 2016, 5 pages.

* cited by examiner

*Primary Examiner* — Tracy M Dove

(57) ABSTRACT

An inert material is included in the electrode assembling of a battery having a thickness which compensates for a difference in dimension of the electrode assembly when thinner electrodes are used to construct a battery having reduced capacity, to thereby be accommodated in a battery case of uniform dimension regardless of the electrical characteristics of the battery.

20 Claims, 13 Drawing Sheets

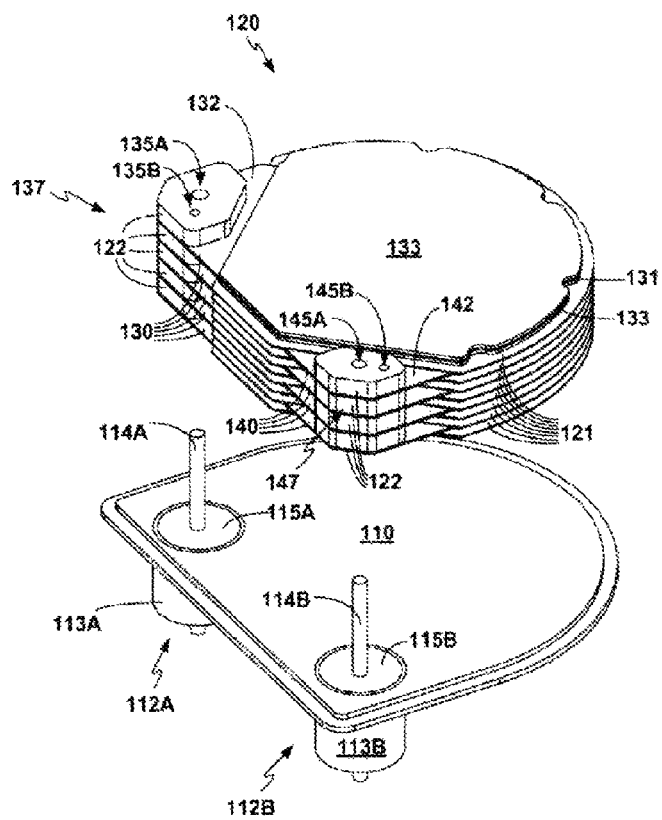
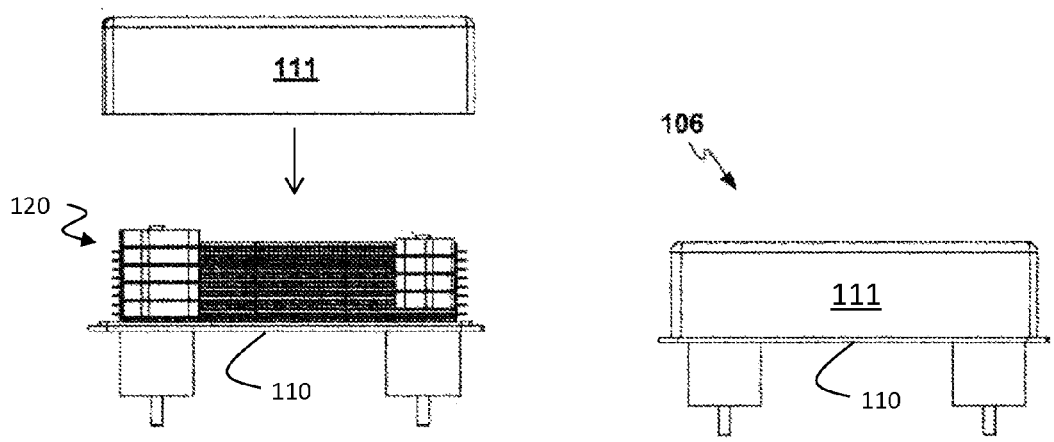
Fig. 2a
Fig. 2b              Fig. 2c

ADJUSTABLE BATTERY STACK AND METHOD OF USE IN DEVICE ENCLOSURE

TECHNICAL FIELD

The present disclosure relates to electrochemical power cells and battery assemblies incorporating such power cells. Various embodiments of the present disclosure find particular application for use in a configuration of primary batteries used to power implantable medical devices.

BACKGROUND

Electrochemical cells in the form of batteries are conventionally used to power many types of electronic devices, and are available in several forms, including, for example, cylindrical, button, pouch and prismatic cells.

Prismatic cells, introduced in the early 1990s, are advantageously utilized in applications which require optimal use of space, and find application, for example, in serving as a power source for medical devices, such as Implantable Cardioverter Defibrillators (ICDs) and Cardiac Resynchronization Therapy Devices (CRT-Ds), which are implanted into a patient.

Batteries are comprised of an arrangement of alternating cell subassemblies, each subassembly including a positive electrode (cathode), a negative electrode (anode) and a separator layer interposed therebetween and also optionally between adjacent subassemblies. The electrodes may take the form of planar conductive members optionally embodied as plates, wound conductive layers, or other configurations of conductive material. In some embodiments, the anode electrode(s) of one or more subassemblies are connected in parallel to a positive current collector, and the cathode electrode(s) thereof are connected in parallel to a negative current collector. This provides combined current delivering capacity of each of the subassemblies as surface areas of interfacing surfaces (interfacial areas) of the cathode electrode(s) and anode electrode(s) are effectively summed. The output voltage is that of the individual assemblies. The current delivering capability of the cell is thus proportional to the total interfacial area between the anode and cathode subassemblies, and can be controlled by varying the footprint of the interfacial areas, for example an interfacing area of plates in a cell stack. Alternatively, subassemblies are connected in series in which case a voltage delivered is the combined voltage of each of the subassemblies with the current delivering capability being that of a given one of individual subassemblies. Thus, the voltage and current characteristics of a battery may be varied.

The capacity of a cell, which is a measure (typically in Amp-hr) of EMF potential chemically stored by the battery, is determined by the mass of active material contained in the battery, i.e., the cathode and anode material. The battery capacity represents the maximum amount of energy that can be extracted from the battery under certain specified conditions. Cell capacity is proportional to the total mass of the anode and cathode (with the appropriate coulombic balance between the two), and is determined as a function of the footprint of the interfacial area, the number of anode and cathode subassemblies, the number of plates in each subassembly, and the thickness of the anode and cathode plates.

Depending on a resultant volume of the subassemblies, for example and not limitation, a stack thickness in a prismatic battery, in achieving a battery having desired power delivering capability and power capacity, either due to changes in the number of anode or cathode plates, the thickness of the anode or cathode plates, or the total number of anode and cathode subassemblies, an overall dimension of a battery of conventional design will vary, thereby requiring battery encasements of differing size configurations.

In the field of medical implantable devices, considerable testing is required to assure that a given device meets appropriate standards for use in human beings. This is also true of the encasements of the devices, which must be constructed to ensure that the device is sufficiently well sealed and of sufficient structural integrity to implant in a person. Thus, it would be advantageous if a given encasement could be used for a variety of medical devices. However, power requirements of medical devices vary and with this variation so do the batteries vary in size. The present disclosure describes an improvement over these prior art technologies.

An implantable medical device is typically designed such that the battery powering it has an operating life, which is based on the total energy capacity, less than a design life of the other components. This is important for device reliability, as the battery longevity can be predicted rather easily, and the patient and/or physician may they be given sufficient warning before it is time to replace the device by the device sensing the remaining energy of the battery. If the device were designed such that the battery could potentially outlast any of the other components, such a warning to the patient and/or physician might be difficult.

Frequently a medical device will be produced in different models, all being assembled from the same primary components, but with each having a different set of features. Sometimes the different feature sets will consume the device battery capacity at substantially different rates (power), resulting in significant differences in the longevity of the different models. In those situations, the battery energy capacity needs to be chosen to deliver the desired longevity in the highest cases of power consumption. In extreme cases, the differences in longevity may be so great that it is desired to provide different battery capacities in the different models, so that the longevity of the battery in the longest lasting model will not exceed the design life of any of the other device components. It is also possible that the varying power consumption of different models may require batteries of different power capability. Typically when either of these situations occur, the different batteries occupy different volumes, requiring changes in the overall device mechanical design. As components are no longer shared between device models, component costs and device costs rise. As such, it is desirable to develop a family of batteries, all using the same outer case, but with varying power and capacity.

SUMMARY

Various embodiments of a battery are provided which allow cells having different power capability and/or capacity to be housed in an envelope of uniform size and methods for producing same. Embodiments of a battery according to this disclosure are directed to a cell or cells comprised of an alternating assembly of anode and cathode plates with an electrolyte-containing separator interposed between the anode and cathode plates, having a configuration which allows a family of devices, for example medical devices implantable in a patient, which are constructed around a standardized battery encasement, but which can have different power capability and/or capacity. The approach according to the various embodiments of this disclosure allows multiple types of batteries having different power supply characteristics, which fit within the same encasement, to be efficiently produced.

Briefly stated, the above objectives are achieved by inclusion of an inert material insert or inserts in the electrode assembly having a thickness which compensates for the difference in height of the electrode assembly when thinner electrodes (anodes and cathodes) or a fewer number of electrodes are used to construct a battery having reduced capacity, to thereby be accommodated in a battery case of uniform height regardless of the power output characteristics of the battery. Optionally, the inert material having an appropriately selected thickness can also replace one or more of the separators.

In accordance with an embodiment of this disclosure, at least one spacer comprised of inert material, conveniently in a general form of a plate, is placed at the top and/or bottom of the electrode assembly, used to maintain constant assembly dimensions between designs.

In accordance with another embodiment of this disclosure, a battery includes at least two cell subassemblies each comprised of at least one anode and at least one cathode, and a separator interposed therebetween, and at least one spacer comprised of inert material is placed within the assembly of electrode plates between cell subassemblies comprising the battery to allow constant assembly dimensions regardless of battery electrical characteristics.

In accordance with yet another embodiment of the present disclosure there is provided a method of producing a product line including electronics modules, respectively having power requirements differing from one another. A plurality of a common encasement having a battery compartment and an electronics compartment are produced. The electronics compartment is configured to accept any of a plurality of electronics modules. Electrode assemblies are provided, each comprising at least one pair of an anode and a cathode with a separator disposed therebetween. The electrode assemblies are respectively configured to match the differing power requirements of the electronics modules such that some of the electrode assemblies have dimensions differing from other ones of the electrode assemblies. The electronics modules respectively inserted into the electronics compartment of a corresponding number of the plurality of the common encasement. For each of the corresponding number of the plurality of the common encasement, one of the electrode assemblies is selected to match a power requirement of the electronics module inserted in the common encasement, the selected one of the electrode assemblies is inserted into the battery compartment, and if the selected electrode assembly occupies less space than provided by the battery compartment so as to leave an unoccupied volume in the battery compartment, an inert insert is inserted into the unoccupied space so as to fill the unoccupied space to an extent necessary to prevent displacement of the electrode assembly.

In some embodiments, the present disclosure provides a family of powered electronic components, such as medical devices implantable in patients, that are constructed around a standardized encasement and a standardized battery encasement, such that they are powered using batteries of uniform dimension and being configurable with different power capability and/or capacity. In some embodiments, the present disclosure provides a method for efficiently producing multiple types of batteries, optionally using stacked plate technology, having different power capability and/or capacity that fit within the same encasement configuration.

The above, and other objects, features and advantages of the present disclosure will become apparent from the following description read in conjunction with the accompanying drawings, in which like reference numerals designate the same elements. The present disclosure is considered to include all functional combinations of the above described features and corresponding descriptions contained herein, and all combinations of further features described herein, and is not limited to the particular structural embodiments shown in the figures as examples. The scope and spirit of the present disclosure is considered to include modifications as may be made by those skilled in the art having the benefit of the present disclosure which substitute, for elements presented in the claims, devices or structures upon which the claim language reads or which are equivalent thereto, and which produce substantially the same results associated with those corresponding examples identified in this disclosure for purposes of the operation of the devices and methods of this disclosure. Additionally, the scope and spirit of the present disclosure is intended to be defined by the scope of the claim language itself and equivalents thereto without incorporation of structural or functional limitations discussed in the specification which are not referred to in the claim language itself.

Additional features and advantages of various embodiments will be set forth in part in the description that follows, and in part will be apparent from the description, or may be learned by practice of various embodiments. The objectives and other advantages of various embodiments will be realized and attained by means of the elements and combinations particularly pointed out in the description and appended claims.

BRIEF DESCRIPTION OF THE DRAWINGS

FIG. 2a is an exploded perspective view of a components of a battery of the exemplary medical device of FIG. 1 including an electrode assembly composed of a plate electrode stack;

FIG. 2b is an exploded front view of a battery cover, the plate electrode stack, and an encasement of the battery of the exemplary medical device of FIG. 1;

FIG. 2c is a front view of the battery of the exemplary medical device of FIG. 1;

FIG. 3b is a front elevation schematic cross-sectional view of the battery of FIG. 3a;

DETAILED DESCRIPTION

Figure 1:
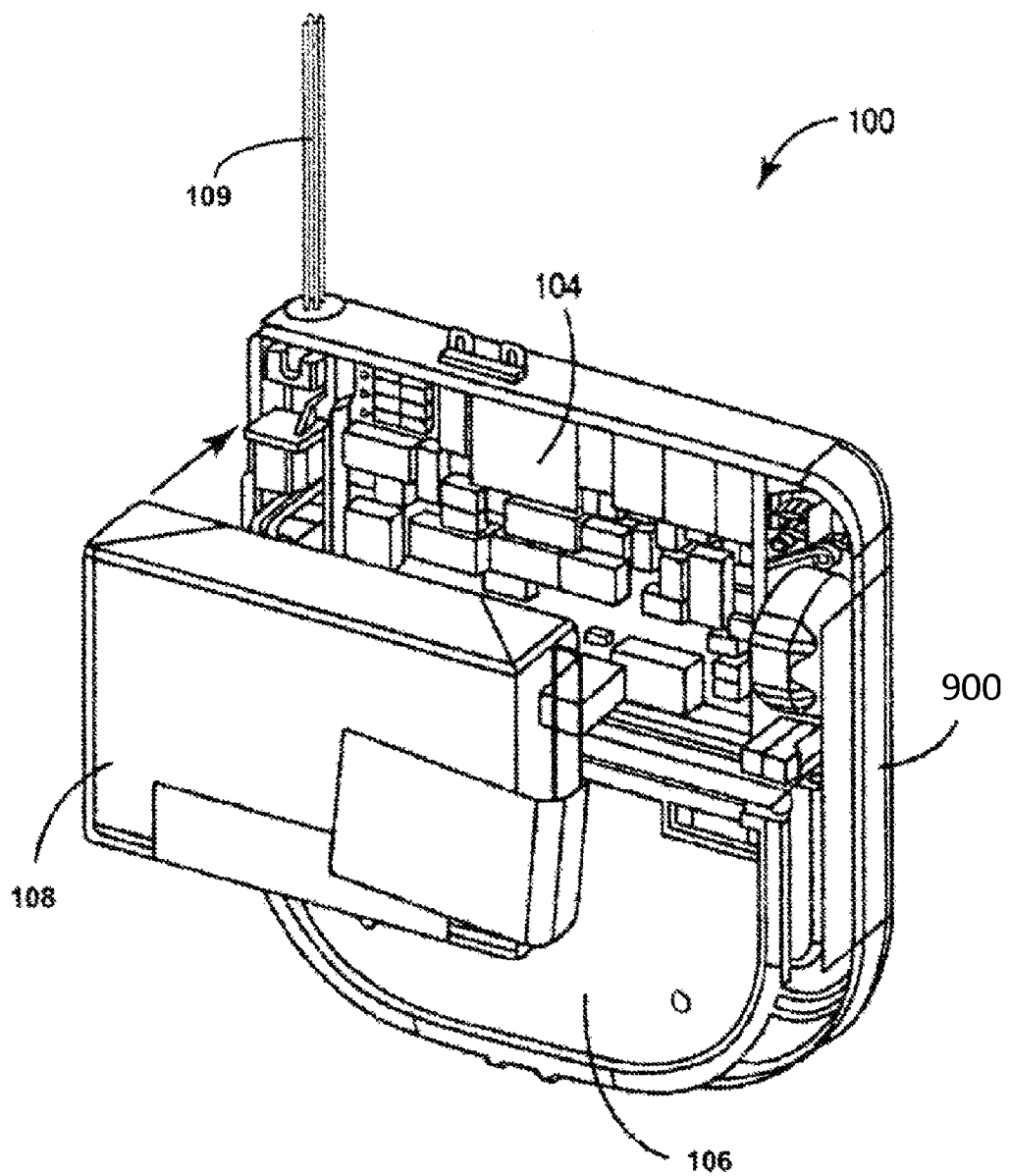
FIG. 1 perspective view of an exemplary medical device according to an embodiment of the present application.

For the purposes of this specification and appended claims, unless otherwise indicated, all numbers expressing quantities of ingredients, percentages or proportions of materials, reaction conditions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of this application are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

In some embodiments, the present disclosure provides an adjustable battery electrode assembly. In some embodiments, the present disclosure provides a system employed with a method to produce medical devices constructed around a standardized battery encasement. In some embodiments of the present disclosure, a method provides batteries having differing power capabilities and/or energy capacities, and a method is provided to efficiently producing multiple types of such batteries that fit within the same encasement.

In some embodiments, the system comprises batteries that are optionally produced using a stacked plate configuration. In some embodiments, the batteries comprise cells having one or more anode assemblies and one or more cathode assemblies, which are alternately stacked to form a cell. In some embodiments, each of the anode assemblies and cathode assemblies comprise one or more anode or cathode plates, respectively. In some embodiments, plates of inert material are placed at either a top or a bottom of a cell and are used to maintain constant stack dimensions.

In some embodiments, a power delivering capability of a cell is proportional to the total interfacial area between the anode subassemblies and cathode subassemblies. In some embodiments, the power delivering capability is controlled by varying the footprint of a cell stack and a number of anode subassemblies and cathode subassemblies. In some embodiments, the power delivering capacity of the cell is proportional to the total volume of anode and cathode with the appropriate coulombic balance between the two. In some embodiments, the power delivering capacity is controlled by varying the footprint of the cell stack, the number of anode subassemblies and cathode subassemblies, the number of plates in each subassembly, and the thickness of the anode plates and cathode plates. In some embodiments, the cell design can vary such that the stack thickness changes, either due to changes in the number of anode plates or cathode plates, the thickness of the anode plates or cathode plates, or the total number of anode subassemblies and cathode subassemblies, and the original stack thickness may be restored by adding plates of inert material to the top of the stack, bottom of the stack, or both. As such, a variety of cells, with different power capabilities and capacities may fit with the same tolerances within the same encasement. In some embodiments, single and dual chamber ICDs and triple-chamber CRT-Ds may each use the same mechanical platform, including battery encasement, and use different cell designs according to energy capacity requirements of each type of device.

Referring to FIGS. 1 through 2c, an embodiment is shown of an exemplary stacked plate battery 106. See, for example, stacked plate batteries as disclosed in U.S. Pat. No. 8,614,017, issued Dec. 24, 2013, to Viavatine, entitled "Electrochemical Cell With Electrode Elements That Include Alignment Apertures" which is incorporated by reference herein in its entirety. FIG. 1 depicts an IMD 100, which may be an implantable pulse generator (IPG), e.g., a pacemaker, or an implantable cardioverter-defibrillator (ICD), as examples. IMD 100 includes an encasement 900, a battery 106 and an electronics module comprised of, for example and not limitation, a control module 104 and capacitor(s) 108. Control module 104 controls one or more sensing and/or stimulation functions of IMD 100, which functions may be performed via leads 109. Battery 106 charges the capacitor(s) 108 and the powers control module 104.

An exploded perspective view of an exemplary assembly of a battery cover 110 and an electrode stack 120 is shown in FIG. 2a. Anode plate electrodes 130 and cathode plate electrodes 140 are electrode elements of the battery 106. In some examples, the anode plate electrodes 130 and the cathode plate electrodes 140 may be substantially planar, in other examples, the anode plate electrodes 130 and the cathode plate electrodes 140 may be curved along one or more axes such as in, for example and not limitation, a spiral wound assembly configured circularly or with the spirals arranged in an oblong configuration. Other formed shapes may also be used.

The battery 106 has a battery case, forming a substantially sealed enclosure, comprised of a casement 111 and a top cover 110 as shown in FIGS. 2b and 2c illustrating assembly of the battery 106. As shown in FIG. 2a, feedthroughs 112A and 112B ("feedthroughs 112") extend through the top cover 110 and each include one of ferrules 113A, 113B ("ferrules 113"), one of feedthrough pins 114A, 114B ("feedthrough pins 114") and one of insulators 115A, 115B ("insulators 115"). In some examples, feedthrough pins 114 have diameters of less than 0.050 inches, such as a diameter of no greater than about 0.030 inches, such as a diameter of about 0.021 inches or a diameter of about 0.012 inches.

It will be appreciated by those skilled in the art having the benefit of the present disclosure alternative interconnection configurations may be used depending on the requirements of a given application. Other connections employ wires, spring contacts, button contacts, printed wiring flexible substrates, or threaded terminals, for example and not limitation.

The battery 106 further includes an electrode stack 120, which is housed within the enclosure formed by the battery case. In some examples, the battery 106 includes a fill port (not shown) as well as a liquid electrolyte within the enclosure. In some examples, the battery 106 may be an organic electrolyte battery 106. In some embodiments the battery 106 may be a solid state battery having separators 121 formed of a polymer electrolyte film.

The electrode stack 120 includes a first set of plate electrodes 130 and a second set of plate electrodes 140. Positioned between each adjacent plate electrode 130 and plate electrode 140 is one of the separators 121. The plate electrodes 130 form a cathode of the battery 106, whereas plate electrodes 140 form an anode of the battery 106 such that the plate electrodes 130 combine with the plate electrodes 140 to form a voltaic cell. The plate electrodes 130 alternate with the plate electrodes 140 within electrode stack 120.

Each of the plate electrodes, 130 and 140, includes a current collector 131 in the form of an electrically conductive substrate. The electrically conductive substrate may be made of a metal, such as alloys of copper, titanium, aluminum etc., or another electrically conductive material. As an example of construction of the anode and cathode electrodes, 130 and 140, the current collector 131 of the top plate electrode 130 has an electrode material 133 that is disposed over the current collector 131. In the battery 106, the conductive substrates are substantially flat, and may include holes, be comprised of a mesh, screen, corrugated material, or other conductive material, or include other features to facilitate adhesion between and embedding of the conductive substrate in the electrode material 133.

Each of the anode electrodes 130 includes one of the current collectors 131, a tab 132 extending therefrom, and the electrode material 133 disposed over the current collector 131. The tab 132 comprises conductive material (e.g. copper, titanium, aluminum etc.). In some examples, the current collector 131 may be a unitary component with a tab 132. The electrode material 133 optionally comprises elements from Group IA, IIA or IIIB of the periodic table of elements (e.g. lithium, sodium, potassium, etc.), alloys thereof, intermetallic compounds (e.g. Li—Si, Li—B, Li—Si—B etc.), or an alkali metal (e.g. lithium, etc.) in metallic form. In a further example, such as a rechargeable cell, the electrode material 133 of the anode plate electrode 130 may be lithium cobalt oxide or other suitable electrode material. The conductive substrate of the anode plate electrode 130 may comprise nickel, titanium, copper an alloy thereof or other suitable conductive material. In some examples, the separator 121 may be coupled to the electrode material 133 at the top and bottom of anode plate electrodes 130, or the separator 121 may be simply interposed between the plate electrodes 130 and 140.

Each of the cathode plate electrodes 140 is constructed in a similar manner as the anode plate electrodes 130. The cathode plate electrode 140 includes a conductive substrate serving as the current collector 131, a tab 142 extending therefrom and an electrode material 133 disposed over the current collector 131 as disclosed above in relation to the anode plate electrode 130. The electrode material 133 of the cathode plate electrodes 140 may comprise metal oxides (e.g. vanadium oxide, silver vanadium oxide (SVO), manganese dioxide etc.), carbon monofluoride and hybrids thereof (e.g., CFX+MnO2), combination silver vanadium oxide (CSVO), lithium ion, or other rechargeable chemistries, or other suitable compounds. In a further example, such as a rechargeable cell, the electrode material 133 of the cathode plate electrode 140 may be lithium titanate, graphite or other suitable electrode material. The conductive substrate of the current collector 131 of the cathode plate electrode 140 may be, for example, titanium, aluminum, nickel or other suitable materials. While the example chemistries provided are optionally employed, in an embodiment in present use a lithium cobalt oxide is used for the cathode plate electrodes 140, i.e., the positive terminal and either lithium titanate or graphite for is used for the anode plate electrode 130, i.e. the negative terminal.

As previously mentioned, each anode plate electrode 130 includes a tab 132. Spacers 122 are positioned between adjacent ones of the tabs 132. Similarly, each of the cathode plate electrodes 140 includes a tab 142, and a spacer 122 is positioned between adjacent ones of the tabs 142. The spacers 122 function to mitigate bending of tabs 132 and 142 during assembly of electrode stack 120 and may be omitted if the current collectors are of sufficient structural integrity. The spacers 122 may also be formed from a conductive material such as titanium, aluminum/titanium clad metal or other suitable materials. Accordingly, the spacers 122 may also serve to electrically connect the anode plate electrodes 130 via the tabs 132 with each other as well as electrically connect the cathode plate electrodes 140 via the tabs 142 with each other within electrode stack 120.

As previously mentioned, tabs 132, 142 may be a unitary component with the electrically conductive substrates of the plate electrodes, 130 and 140, respectively. In one example, the tabs 132 may be formed by masking a portion of an electrically conductive substrate when depositing an electrode material, e.g., lithium, on the electrically conductive substrate of a plate electrode. The electrically conductive substrate may be masked by placing a material, such as a polymer between the electrically conductive substrates and the electrode material 133. In some examples, the mask material may be die cut to provide precise masking of the tabs 132 and 142.

The thickness of the spacers 122 is dependent on the thicknesses of the anode plate electrodes 130 and the cathode plate electrodes 140. As an example, the spacers 122 may have a thickness of less than 0.060 inches, such as a thickness of about 0.020 inches. In other examples, the spacers 122 may have a thickness of between 0.10 inches to 0.060 inches. In a further example, such as in a rechargeable cell, the spacers 122 may have a thickness of between 0.005 inches to 0.020 inches. For example, the electrode material 133 of rechargeable cells may be formed using a slurry process, which can provide thinner electrode plates than in the case of a pressed powder process more commonly used for making electrode plate in non-rechargeable cells. In general, the thickness of the spacers 122 should be selected to match the spacing between adjacent ones of the tabs 132 and adjacent ones of the tabs 142 when the anode plate electrodes 130 and the cathode plate electrodes 140 are stacked, e.g., directly on each other.

See, for example, details and techniques suitable for the construction of the electrode stack 120 as disclosed in United States Patent Publication Number 2009/0197180 by Viavattine et al., titled "Spacers Between Tabs of Plate Electrodes In An Electrochemical Cell For An Implantable Medical Device," the entire contents of which is incorporated by reference herein. Furthermore, it is to be understood that the present disclosure is not limited to electrode assemblies composed of planar plates and is intended to include electrode assemblies of wound electrode layers, laminated electrode layers, or machined, molded, or deposited electrodes.

Referring to FIGS. 3*a*-8 and 10*a*-11, the encasement 900 and electronics modules 901-907, (corresponding to the control module 104 and the capacitor(s) 108 of FIG. 1) are shown in a schematic fashion, signaling that the actual physical configurations illustrated are simplified for both clarity purposes and to indicate that no specific shape or relative arrangement thereof is intended to limit the present disclosure. Similarly, details of electrical connections between the feedthrough pins, 114A and 114B, and power inputs of the electronics modules, 901-907, are omitted as any type of interconnection as may devised by those skilled in the art are optionally employed. Likewise, the configuration shown of the electrical connection from the current collectors 131 to the electronics modules, 901-907, i.e. feedthroughs, 112A and 112B, is not considered limiting as alternative interconnections employing, for example and not limitation, spring terminals, button contacts, wiring, flexible or rigid substrate printed conductors, foil, or other conductive interconnections are optionally used for practicing the method and devices of the present disclosure. Still further, while the FIGS. 3*a*-8 and 10*a*-11, show, as an example, a stacked plate electrode arrangement, as noted above, other battery electrode structures or assemblies may be employed in the practice of the present disclosure. The casement 111 and top cover 110 are likewise represented schematically as battery case 150. Additionally, in some embodiments of the present disclosure, either or both of the encasement 900 and the battery case 150 may function as a terminal for power interconnection purposes. Furthermore, insulation isolating the battery case 150 from the anode and cathode electrodes, 130 and 140, and electrical interconnections as is required in a given configuration is omitted for purposes of simplicity and application thereof will be understood by those skilled in the art. It will be further understood that where the battery case 150 is to serve as a battery terminal the insulation will be appropriately configured to allow electrical connection of one the anode and cathode electrodes, 130 and 140, to the battery case 150.

For exemplary purposes, each of the electronics modules, 901-907, is considered to have different power supply requirements, whether it be one or all of a voltage requirement, a current delivery capability, or a power/energy capacity resulting in a given expected operational life under known conditions. Likewise, relative configurations of the encasement 900 and the electronics modules, 901-907, is also exemplary and are presented to convey a concept that the encasement 900 is common to each of the differing electronics modules, 901-907, which have different power supply requirements but may be stowed within a common volume of the encasement 900 as represented in FIGS. 3*a*-8 and 10*a*-11, schematically as a common oblong shape of each of the electronics modules 901-904. Hence, FIGS. 3*a*-8 and 10*a*-11, depict various exemplary embodiments of the present disclosure which are directed to providing alternative power characteristic batteries which have the battery case 150 in common so as to be employable in the common encasement 900.

Figure 3A:
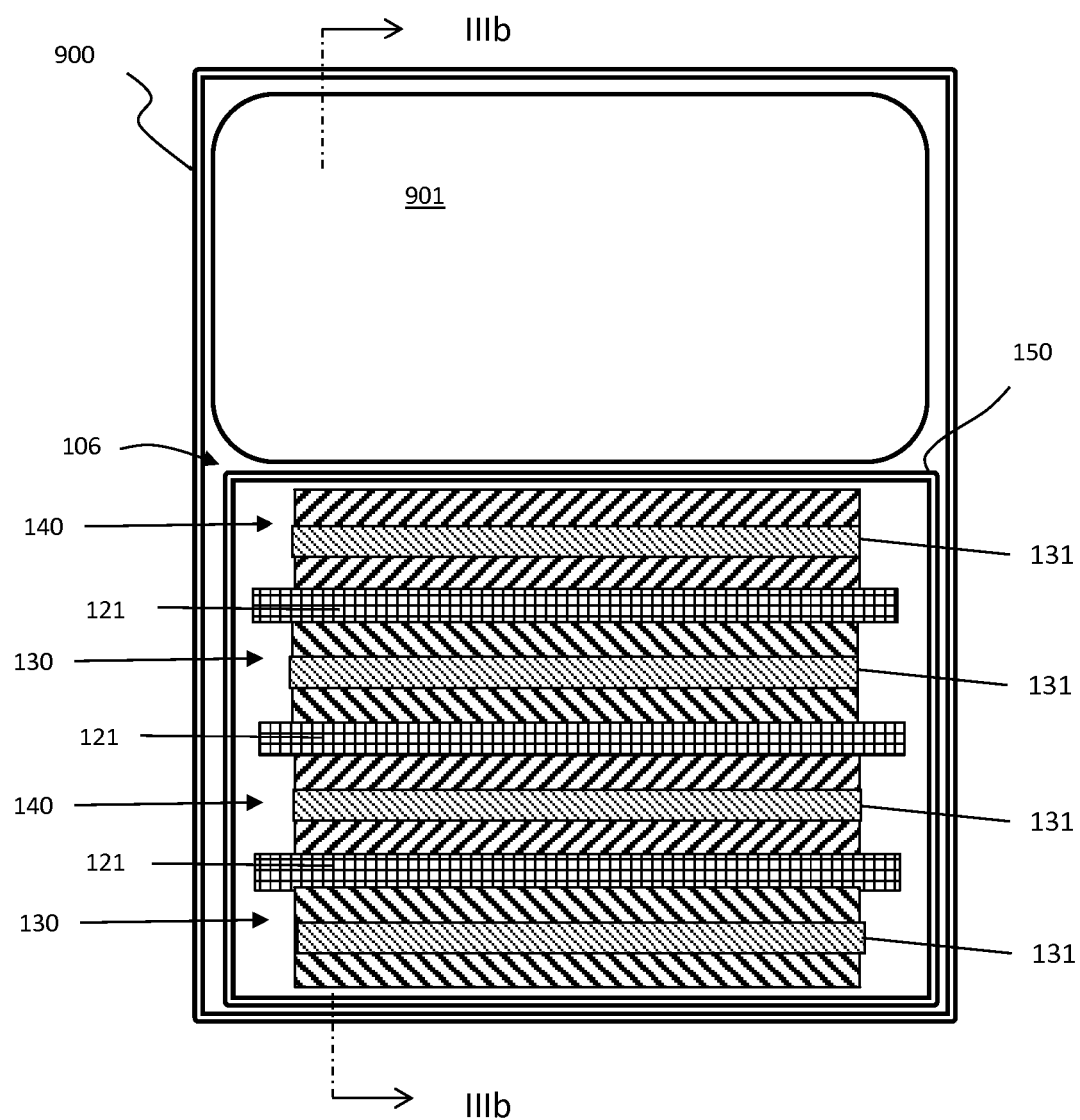
FIG. 3a is a side elevation schematic cross-sectional view of a battery according to an embodiment of the present application.
Figure 3B:
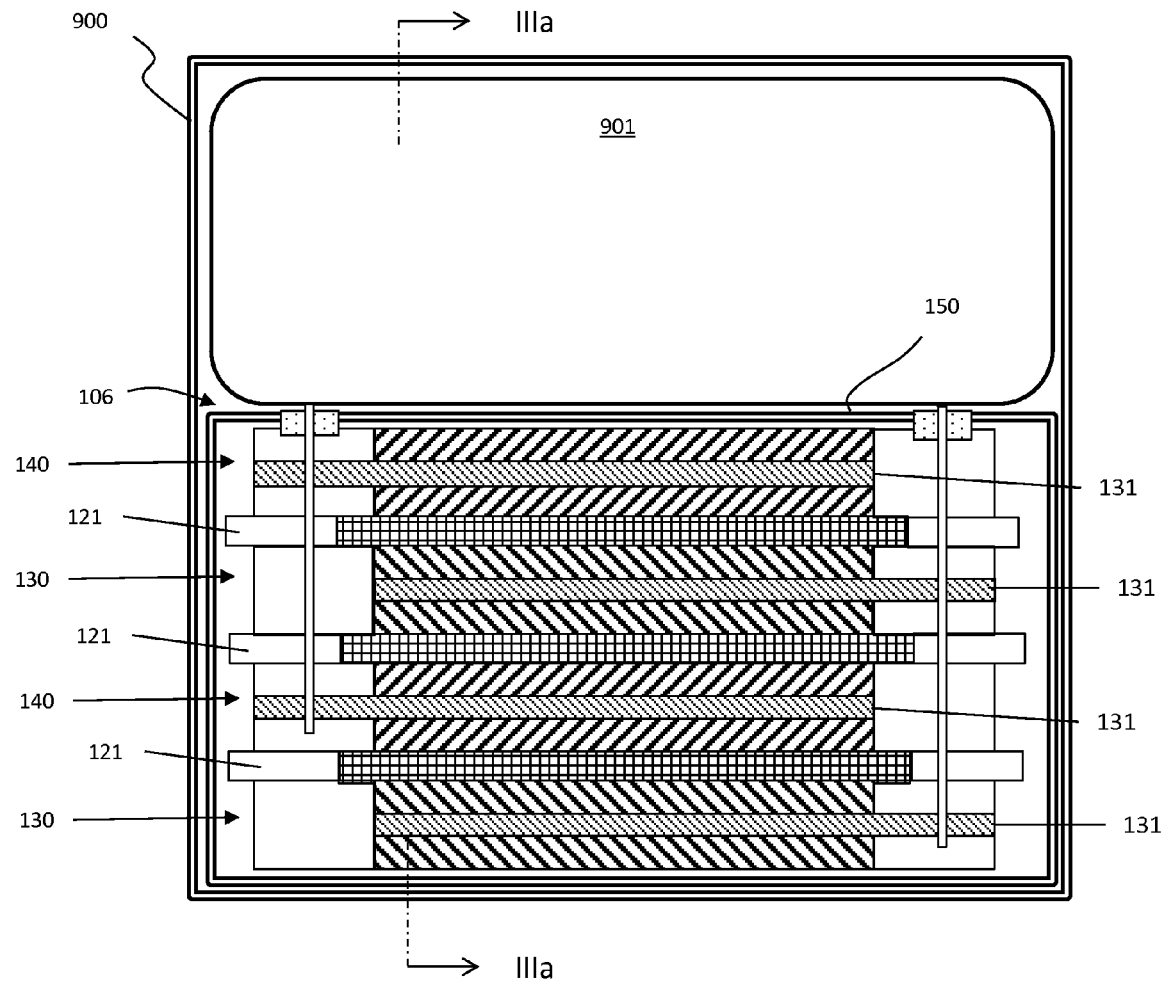

Referring to FIGS. 3*a* and 3*b*, the battery 106 is schematically depicted as a battery optionally utilizing stacked plate technology, generally designated by the numeral 106, wherein FIG. 3*a* shows a side cross-sectional view while FIG. 3*b* shows a front cross-sectional view. The battery 106 includes the battery case 150 in which is accommodated the stack of electrode plates comprised of the anode electrodes 130*s* and the cathode electrodes 140*s* stacked in alternating succession with the separators 121 interposed therebetween.

When used in exemplary medical devices designed to be implanted in patients, the battery 106 is selected to have a high charge density providing extended life. Based on current technology, the most commonly used battery cell type for such applications is a lithium cell. However, this disclosure is not limited to such technology, and applies equally to other presently known electrochemical platforms, primary or rechargeable, as well as any developed in the future which operate to produce an electrical output. The battery 106 of FIGS. 3*a* and 3*b* is of a design to maximize power capacity with a bulk of a volume of the battery case 150 being occupied by the anode electrodes 130*s* and cathode electrodes 140*s*. A volume of the stack of the anode electrodes 130*s* and cathode electrodes 140*s* defines a power capacity (energy capacity) of the battery 106 and, for the purpose of simplicity in the present disclosure, will be considered proportional to an area of representation thereof in FIGS. 3*a*-8 and 10*a*-11. In the event that another battery with less current capacity and/or a reduced operational life (based on energy capacity and power drain) were desired, the anode electrodes 130*s* and cathode electrodes 140*s* would be constructed of electrodes of less interfacial surface area, and/or thinner plates, and/or fewer electrodes. The electronics module 901 will be considered to have power supply requirements matching those provided by the battery 106.

FIGS. 4-8 and 10*a*-11 depict further embodiments of the present disclosure represented, for purposes of simplicity and clarity, by side cross-sectional views as in FIG. 3*a*. The interconnection of cathode and anode electrodes, shown in these figures, to respective electronics modules is the same as the exemplary arrangement shown in FIG. 3*b* with the exception that the anode electrodes and the cathode electrodes are shifted to compensate for differing electrode thicknesses or number.

Figure 4:
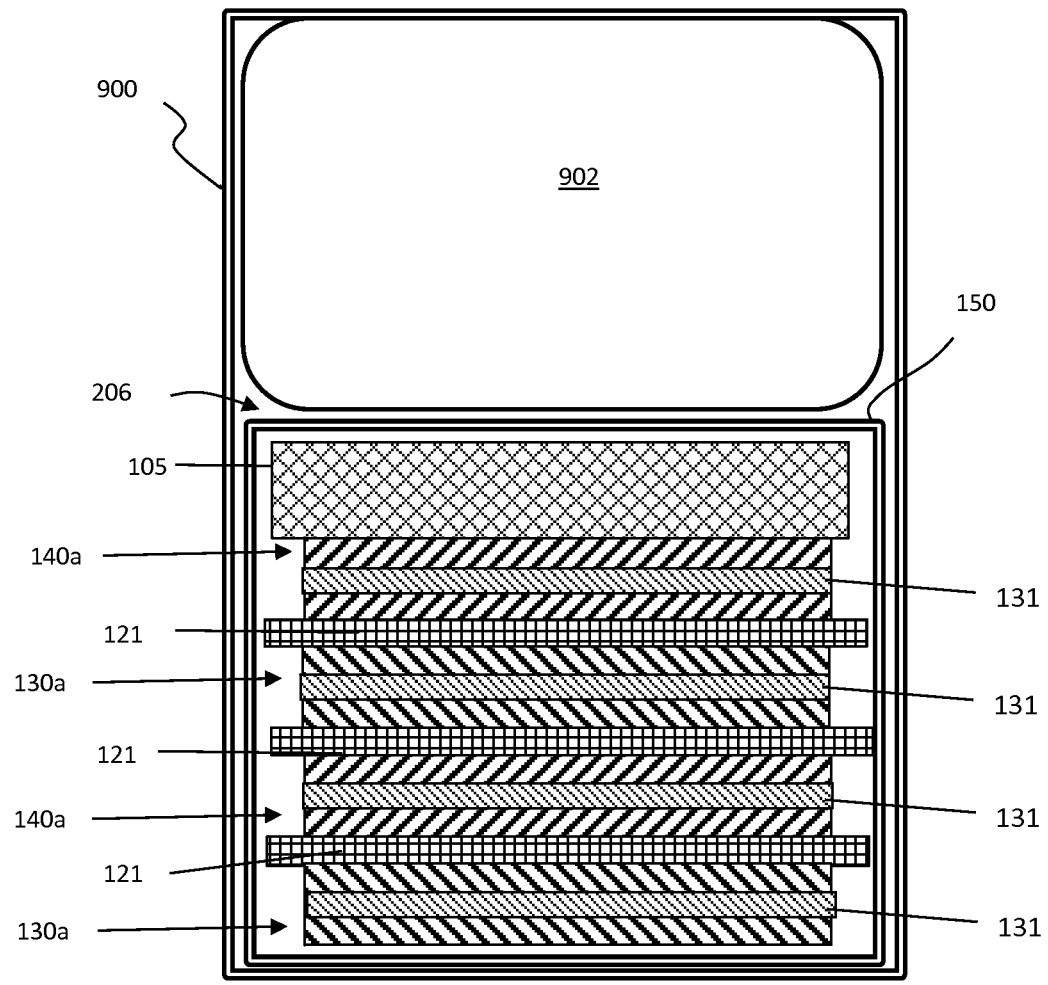
FIG. 4 is a side elevation schematic cross-sectional view of another battery according to another embodiment of the present application wherein an inert insert is disposed above an electrode assembly.

FIG. 4 depicts a first embodiment of a battery according to the present disclosure, generally designated by the numeral 206. The battery 206 includes the battery case 150, common to each of the embodiments of batteries presented herein. As noted above, the battery case 150 is exemplary, and may be of different configuration, but for the purpose of demonstrating the method of the present disclosure, is to be considered the same in each of the embodiments of the present disclosure, hence having a same reference numeral 150 throughout, thus being a battery case of common format employed for batteries of differing characteristics. Hence, the battery case 150 of the figures is such that it can be used interchangeably in a battery compartment of the encasement 900, i.e., a space depicted beneath the electronics modules 901-907 of FIGS. 3a-8 and 10a-11. The electrode stack 120 of FIGS. 2a and 2b being comprised of anode electrodes 130a and cathode electrodes 140a stacked in alternating succession with the separators 131 interposed therebetween.

The battery 206 has a reduced energy capacity as compared to battery 106 of FIGS. 3a and 3b, implemented by use of the anode electrodes 130a and the cathode electrodes 140a having a reduced thickness as compared to the anode electrodes 130s and the cathode electrodes 140s of FIGS. 3a and 3b. This reduction in capacity is effected to match requirements of the electronics module 902. Consequently, a stack height of the battery 206 is made less than that of the battery 106, leaving a top space open within the battery case 150. An inert spacer 105, sized to compensate for the difference in height, is placed atop the stack to maintain the anode electrodes and cathode electrodes, 130a and 140a, in position. Optionally, the inert spacer could be made thicker, with a commensurate further reduction of thickness of the anode and cathode electrodes, 130a and 140a.

Figure 5:
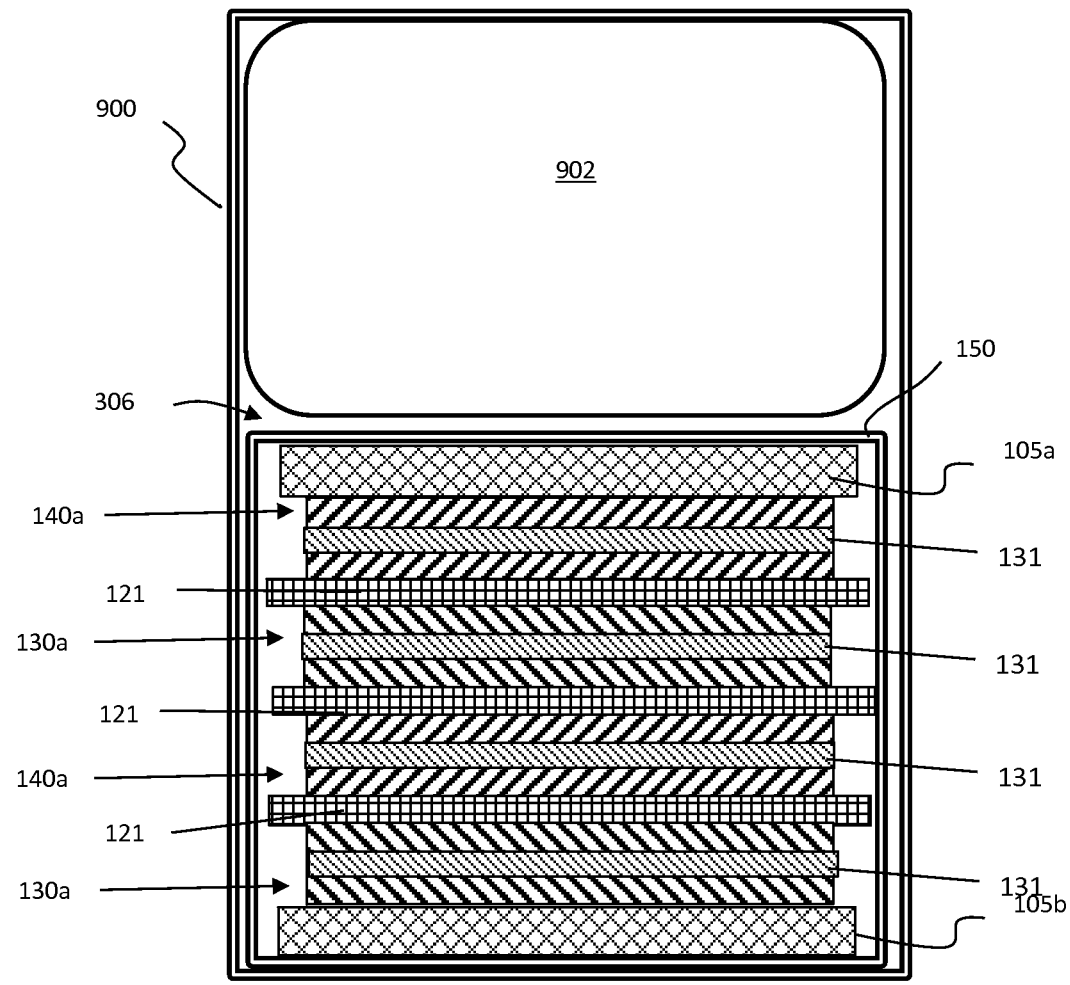
FIG. 5 is a side elevation schematic cross-sectional view of another battery according to another embodiment of the present application wherein inert inserts are disposed above and below an electrode assembly.

Referring to FIG. 5, a second embodiment of this disclosure depicts a battery 306 which includes the battery case 150. A stack of electrode plates is comprised of the anode electrodes 130a and the cathode electrodes 140a, of like configuration to those of FIG. 4, stacked in alternating succession with separators 121 interposed therebetween. The electronics module 902 is the same as that of FIG. 4, hence the anode electrodes 130a and the cathode electrodes 140a are likewise of the same dimensions and number as in FIG. 4, thus having the same reference designators. The battery 306 differs from the battery 206 in that the inert spacer 105 is replaced with two inert spacers 105a positioned above and below the stack.

As in the case of the battery 206, the battery 306 has a reduced energy capacity as compared to battery 106 of FIG. 3a. This is achieved by use of the anode electrodes 130a and the cathode electrodes 140a having a reduced plate thickness as compared to anode electrodes 130s and cathode electrodes 140s of FIG. 3a. Consequently, as with the embodiment of FIG. 4, a stack height of battery 306 is less than that of battery 106, leaving unoccupied spaces within the battery case 150 in the height dimension. In accordance with the depicted example of FIG. 5, the top inert spacer 105a and the bottom inert spacer 105b are of appropriately selected aggregate thickness to compensate for the difference in stack height.

Figure 6:
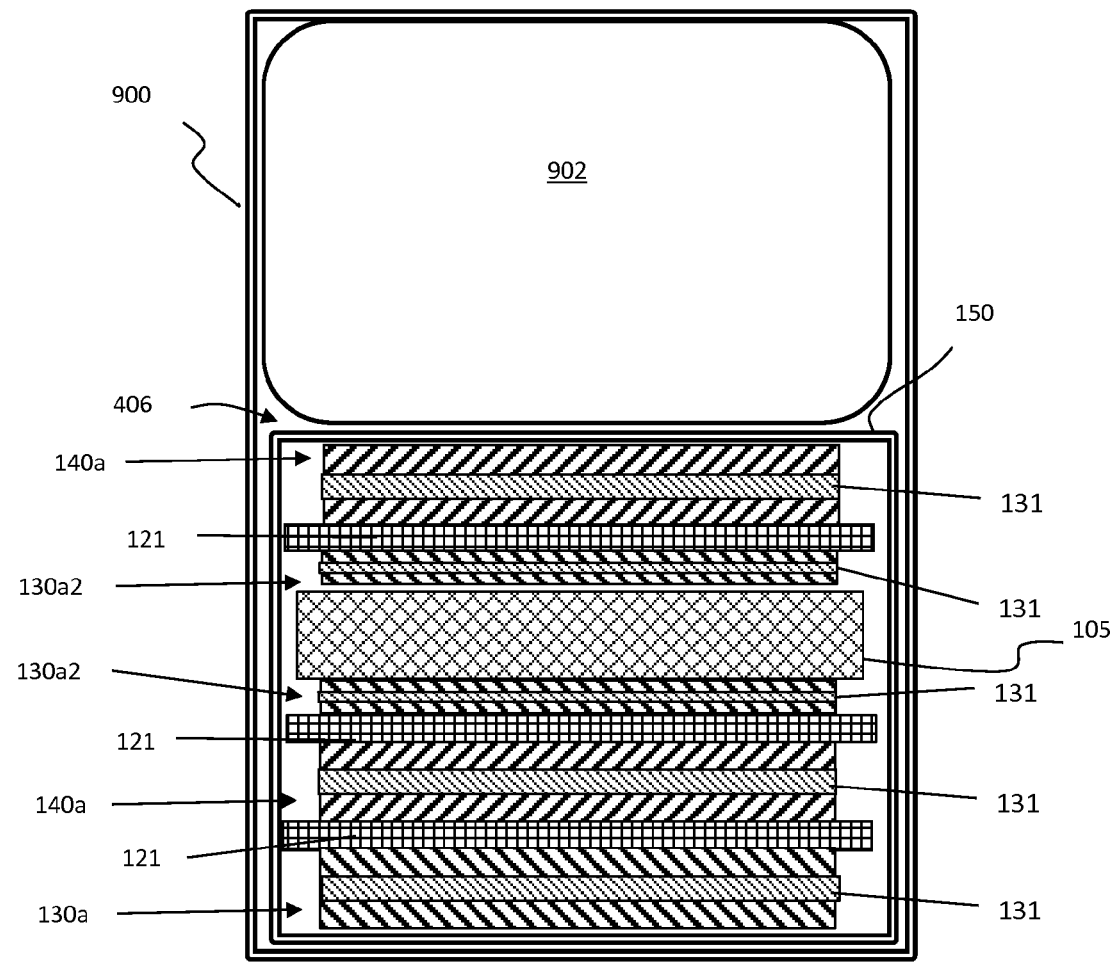
FIG. 6 is a side elevation schematic cross-sectional view of another battery according to another embodiment of the present application wherein an inert insert is disposed between or within an electrode assembly.

FIG. 6 depicts a battery 406 according to a third embodiment of this disclosure, which includes the battery case 150 of FIGS. 1-5. A stack of electrode plates is comprised of the anode electrodes 130a and the cathode electrodes 140a stacked in alternating succession with the separators 121 interposed therebetween. As in the case of the batteries, 206 and 306, of FIGS. 4 and 5, the battery 406 has a reduced energy capacity as compared to battery 106 of FIG. 3a, achieved by a reduction in plate thickness of the anode electrodes 130a and the cathode electrodes 140a as compared to the anode electrodes 130s and the cathode electrodes 140s of FIG. 3a. Consequently, as with the embodiments of FIGS. 4 and 5, a stack height of battery 406 is less than that of battery 106, leaving unoccupied space within battery case 150 in the height dimension. In accordance with the depicted example of the third embodiment, the spacer 105 of appropriately selected thickness to compensate for this difference in stack height is placed within the stack. In this embodiment, one of the anode electrodes 130a is replaced with split anode electrodes 130a2, and the inert spacer 105 is placed therebetween. The combined stack height is the same as that of FIGS. 4 and 5, hence the same electronics module 902 is optionally used in this embodiment.

Figure 7:
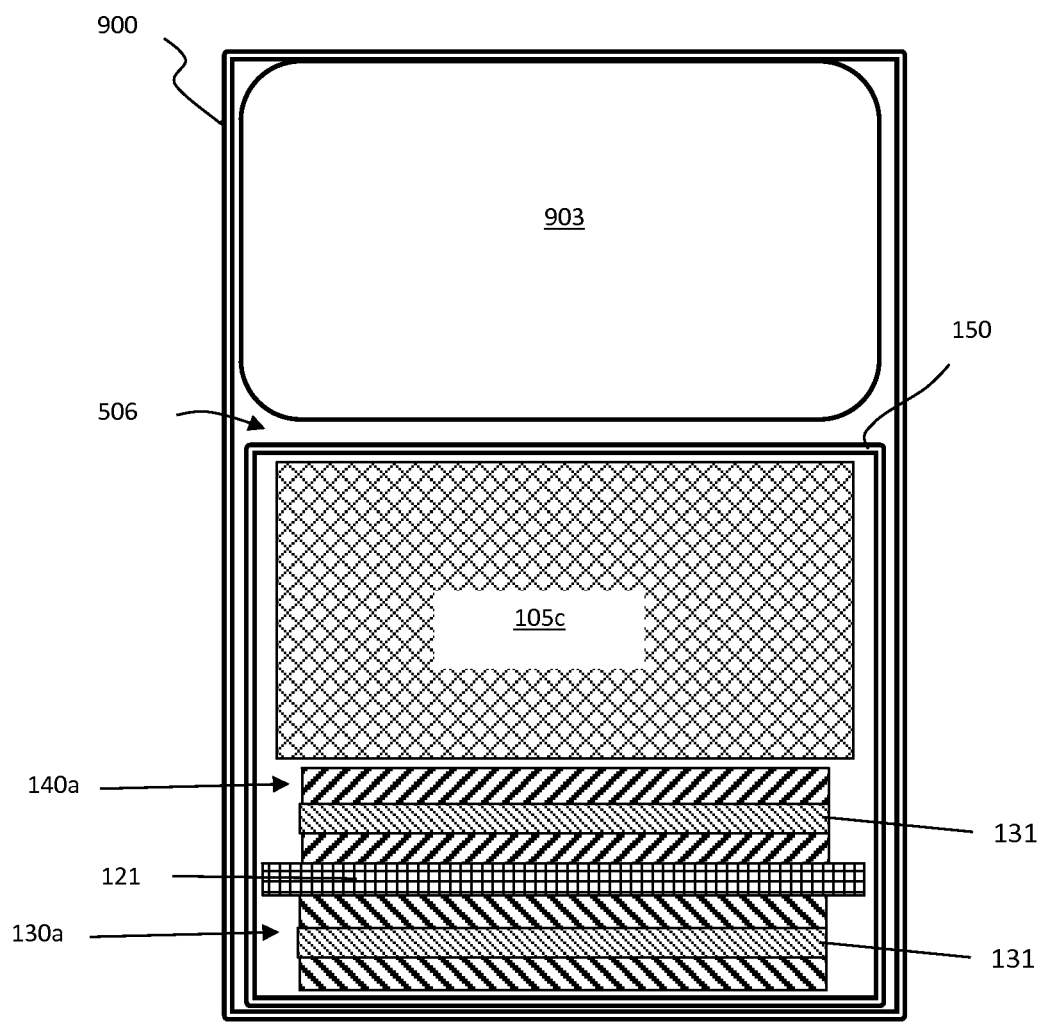
FIG. 7 is a side elevation schematic cross-sectional view of another battery according to another embodiment of the present application wherein an inert insert is disposed above an electrode assembly.

FIG. 7 depicts a battery 506 according to a fourth embodiment of this disclosure, which includes the battery case 150 of FIGS. 1-6. A stack of electrode plates is comprised of the anode electrode 130a and the cathode electrode 140a stacked with the separator 121 interposed therebetween. The battery 406 has a reduced energy capacity as compared to battery 106 of FIG. 3a. In this example one pair of the anode electrode 130a and the cathode electrode 140a is illustrated instead of two pairs. When the anode and cathode electrodes, 130a and 140a, of the prior figures are connected in parallel as illustrated, the single pair of the anode and cathode electrodes, 130a and 140a, will produce half the current delivery capacity in comparison to the parallel connection of two pairs illustrated. If the pairs of the anode and cathode electrodes, 130a and 140a, in the prior figures were connected serially (which is an embodiment included in the present disclosure as the parallel connection illustrated is exemplary and non-limiting, hence a serial connection is considered to be within the scope and spirit of the present disclosure), the battery 506 produces half the voltage of the above described batteries 106, 206, 306, and 406, when a serial connection is used with the understanding that the anode and cathode electrodes, 130a and 140a, are of like electrochemical composition as those in the prior figures. In this example, a different electronics module 903 is shown which has an exemplary power supply requirement(s) matching that of the battery 506. Consequently, as with the embodiments of FIGS. 4-6, a stack height of battery 406 is less than that of battery 106 due to reduced thickness and number of electrodes, leaving unoccupied space within battery case 150 in the height dimension. In accordance with the depicted example of the fourth embodiment, an inert spacer 105c of appropriately selected thickness to compensate for this difference in stack height is placed within the stack.

Figure 8:
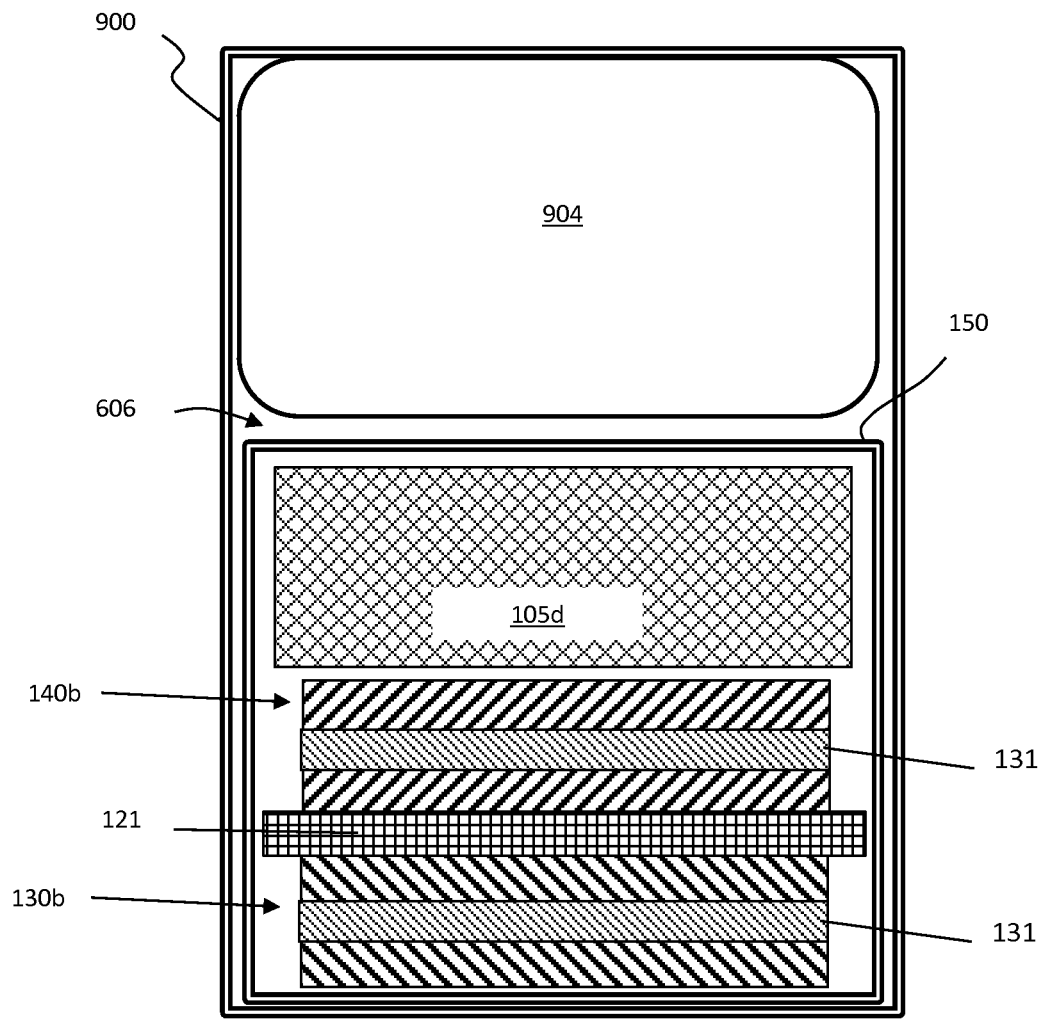
FIG. 8 is a side elevation schematic cross-sectional view of another battery according to another embodiment of the present application wherein an inert insert is disposed above an electrode assembly.

FIG. 8 depicts a battery 606 according to a fifth embodiment of this disclosure, which includes the battery case 150 of FIGS. 1-6. A stack of electrode plates is comprised of an anode electrode 130b and a cathode electrode 140b stacked with the separator 121 interposed therebetween. The battery 606 has an increased energy capacity as compared to the battery 506 of FIG. 7 by virtue of the anode electrode 130b and the cathode electrode 140b being thicker than the anode electrode 130a and the cathode electrode 140a of the other embodiments presented herein. As in the case of the fourth embodiment, one pair of the anode electrode 130s and the cathode electrode 140b is used instead of two pairs. In this example, a different electronics module 904 is used which has a power supply requirement of a greater energy capacity than the electronics module 903 and/or which has a greater operational life than the electronics module 903 of FIG. 7. The stack height of the battery 606 is greater than a height of the stack of the battery 506 and less than that of battery 106, leaving unoccupied space within battery case 150 in the height dimension. In accordance with the depicted example of the fifth embodiment, an inert spacer 105d, of an appropriately selected thickness is used to compensate for this difference in stack height.

While for purposes of illustration, the battery 106 of FIG. 3a is being used to set the size standard for the battery case 150 used for any battery designed with reduced capacity, it will be understood that an inert spacer could be used in the largest capacity battery desired in order to plan for the unexpected contingency that a battery having the same size battery case and increased capacity might be required in the future. Then the inert spacer could conceivably be eliminated to allow for an increase in stack height, without requiring a larger battery case to accommodate the higher energy capacity electrode assembly.

It is to be understood that in the fourth and fifth embodiments, the inert spacers, 105c and 105d, are optionally placed on top of the stack, and that this disclosure is not so limited and also includes embodiments wherein the inert spacers, 105c and 105d are placed in the bottom of the battery case 150 and the stack is placed on top. Alternatively, of the anode electrodes, 130s, 130a or 130b or the cathode electrodes, 140s, 140a or 140b, could be split as in the third embodiment. Furthermore, the present disclosure includes another embodiment wherein the inert spacer is placed in the middle of a stack and neither of the cathode(s) or the anode(s) is/are split as done in the third embodiment.

It is also to be understood that, in a further embodiment of this disclosure, the battery case 150 and the encasement 900 are optionally integrated together into a dual compartment case to be formed as one piece or an assemblage of pieces. The battery stack(s) and the inert insert(s) are disposed in a battery compartment corresponding to the battery case 150, and the electronics modules are disposed in an electronics compartment above the battery compartment in one embodiment. In another embodiment, the battery compartment is above the electronic compartment. In yet another embodiment the compartments are side by side. It is to be further understood that the electronics modules are configured as assemblies of electronic components and may be embodied as exposed circuit boards, or circuit boards within a housing.

Figure 9A:
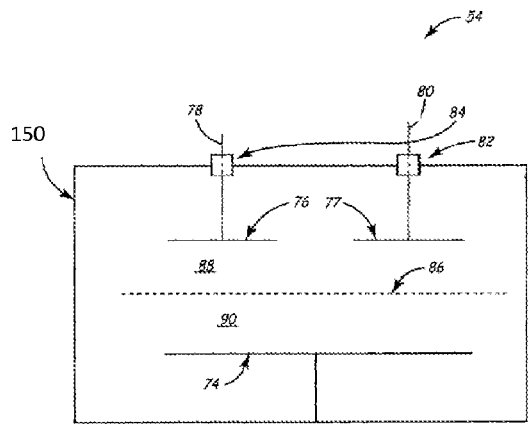
FIG. 9a is a simplified schematic diagram of a high-rate dual-cell battery embodiment in accordance with a prior art embodiment of a battery.
Figure 9B:
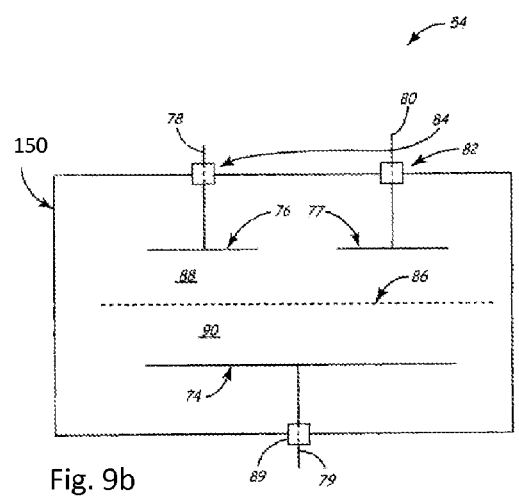
FIG. 9b is a simplified schematic diagram of a high-rate dual-cell battery embodiment in accordance with another prior art embodiment of a battery.
Figure 9C:
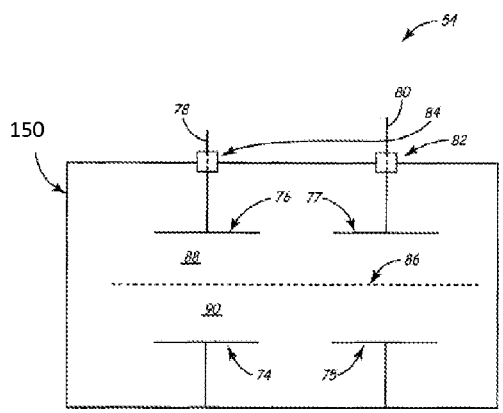
FIG. 9c is a simplified schematic diagram of a high-rate dual-cell battery embodiment in accordance with another prior art embodiment of a battery.

Referring to FIGS. 9a-9c, there are applications wherein two or more battery cells of differing characteristics, such as voltage, current delivery, or energy capacity with related operational life, are advantageously employed. See, for example, applications as disclosed in U.S. Pat. No. 7,209,784, issued Apr. 24, 2007, to Schmidt, entitled "High Power Implantable Battery With Improved Safety And Method Of Manufacture," which is incorporated by reference herein in its entirety. Details of specific requirements of such batteries are omitted for clarity purposes in the present disclosure but, suffice to say, that again various electronics modules dictate requirements of the battery cells.

Referring to FIG. 9a, simplified schematics of a high-rate dual cell battery are shown as disclosed in. In this embodiment battery 54 is shown having the battery case 150, an anode 74, a cathode 76, a cathode 77, a separator 86, feedthrough 84, feedthrough 82, terminal 78, and terminal 80. The battery case 150 is merely shown schematically, as the battery case 150 can be variable in shape and construction. Battery case 150 can be a deep drawn case. See, for example, the cases discussed in U.S. Pat. No. 6,040,082 (Haas et. al.) which is incorporated by reference herein in its entirety. Battery case 150 can be a shallow drawn case. See, for example, the cases discussed in U.S. Patent Application Publication 2004/0064163, filed on Sep. 30, 2002, entitled "Contoured Battery for Implantable Medical Devices and Method of Manufacture" which is incorporated by reference herein in its entirety. Battery case 150 is preferably made of a medical grade titanium, however, it is contemplated that battery case 150 could be made of almost any type of material, such as aluminum and stainless steel, as long as the material is compatible with the battery's chemistry in order to prevent corrosion. Further, it is contemplated that battery case 150 could be manufactured from most any process including but not limited to machining, casting, thermoforming, or injection molding.

In the embodiment of FIG. 9a, one electrode 74 is continuous and is connected to case 150. The alternate electrode is in two separate pieces 76 and 77. Each piece 76 and 77 has a separate electrical lead 78 and 80 electrically connected respectively through feedthroughs 84 and 82 which are electrically isolated from case 150. It is contemplated that battery 54 can be case negative (anode connected to case) or case positive (cathode connected to case). As shown, dual cell battery 54 has the one anode 74, which is utilized by a first cell chamber 88 and a second cell chamber 90, which are separated by a separator 86. There is no requirement of a hermetic seal between cells 88 and 90. They could be designed this way, but it would be an unnecessary complication and result in a decrease in volumetric efficiency. Separator 86 is used to prevent direct electrical contact between anode 74 and cathodes 76 and 77. It is a porous material that allows transport of electrolyte ions. Li/SVO batteries typically use separators comprised of porous polypropylene or polyethylene, but there are many other materials used for other battery chemistries. Nevertheless, separator 86 is not required and the battery 54 can operate without it. Further, it is noted that the anode/cathode relationship could be reversed. For example, anode 74 could be replaced with a cathode as long as cathodes 76 and 77 were switched to anodes. It is understood that the orientation of the anodes and cathodes is not a critical aspect of the invention. Although lithium hexafluoroarsenate is preferably used in both cells 88 and 90 for the present embodiment, it is contemplated that most any chemical electrolyte could be used without departing from the spirit of the present disclosure for either cell chamber 88 or 90. Cathodes 76 and 77 are located within cells 88 and 90 respectively and are connected to external leads 78 and 80 respectively, which traverse out of battery case 150 through feedthroughs 84 and 82. While the battery 54 is shown with two feedthroughs, it is fully contemplated that battery case 150 could have one feedthrough to accommodate both leads 78 and 80. With reference to FIG. 9b, a simplified schematic of another high-rate dual cell battery is shown. In contrast to the dual cell embodiment of FIG. 9a, continuous electrode 74 is not connected to case 150. Instead electrical lead 79 extends through feedthrough 89 to make case 150 neutral.

With reference to FIG. 9c, a simplified schematic of another high rate dual battery is shown. In contrast to the dual cell embodiment of FIG. 9a, the anode is not continuous and each piece 74 and 75 is connected to the case 150. This would be equivalent to taking two completely separate cells and placing them in the same battery case.

Figure 9D:
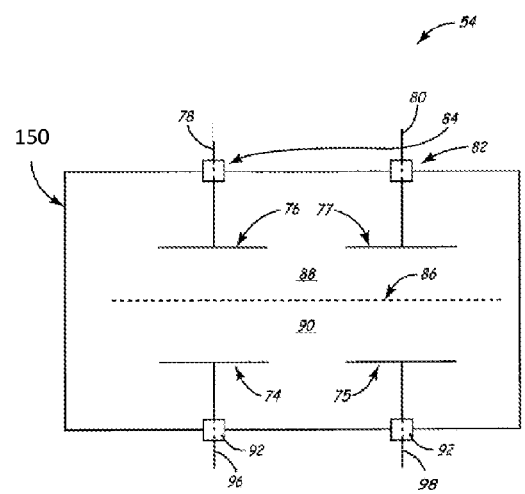
FIG. 9d is a simplified schematic diagram of a high-rate dual-cell battery embodiment in accordance with another prior art embodiment of a battery.

With reference to FIG. 9d, a simplified schematic of another high rate dual battery is shown. This design is similar to the embodiment of FIG. 9c, except electrical leads 96 and 98 traverse through feedthroughs 92 and 94 to make a case neutral design.

The method and devices of the present disclosure are advantageously applicable to the battery configurations of FIGS. 9a-9d wherein dual cells are provided to address differing power source requirements of a given electronics module. Applying the inert inserts discussed above to the dual cell arrangement advantageously provides for numerous combinations of power supply characteristic to be delivered in a common enclosure, i.e., the battery case 150. It will be appreciated that it is within the scope and spirit of the present disclosure to apply the alternative inert insert dispositions any of FIGS. 4-8 to both or any one of a high power rate cell 60 and/or a low power rate cell 62 shown in FIGS. 10*a* and 10*b* to arrive at the desired power characteristics of the dual cells. For exemplary purposes, the inert insert configuration of FIG. 4 applied to the schematic representations of FIGS. 9*a*-9*d* is shown in FIGS. 10*a* and 10*b*.

Figure 10A:
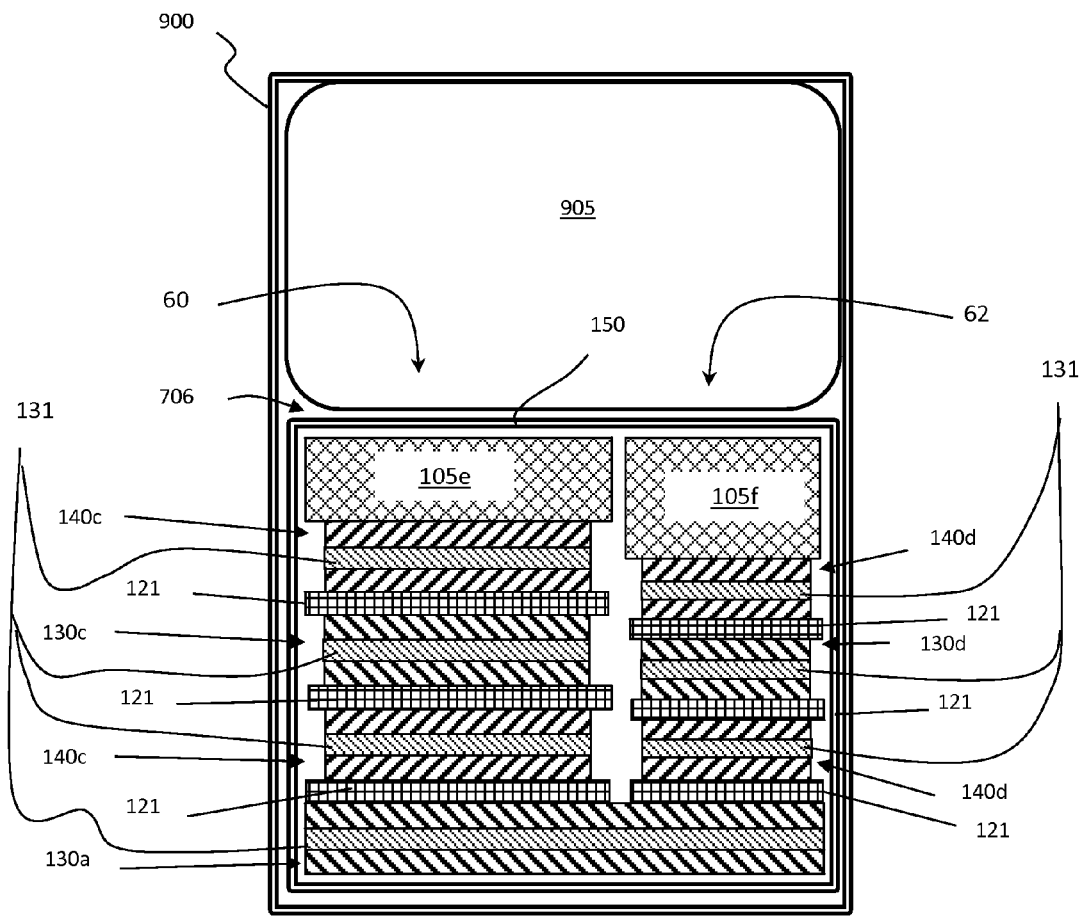
FIG. 10a is a side elevation schematic cross-sectional view of another battery according to another embodiment of the present application wherein inert inserts are disposed above an electrode assembly.

Referring to FIG. 10*a*, an embodiment of a battery 706 of the present disclosure which is applicable to the battery configurations of FIGS. 9*a* and 9*b* and which is constructed to address the power requirements of an electronics module 905 is shown. The common electrode 74 is shown embodied as a common anode electrode 130*a* for exemplary and non-limiting purposes. The other electrodes, 76 and 77, are respectively embodied as cathode electrodes 140*c* and 140*d*. Of course, the disposition of cathodes and anodes may be reversed. The separator 86 is embodied as the separators 121 which are depicted as discontinuous across cells of the battery 706, but could also be continuous as implied in FIGS. 9*a*-9*d*. An inert insert 105*e* is provided in a stack of a high power rate cell 60 and inert insert 105*f* is used in a stack of a low power rate cell 62. Illustration of electrical connections of the current collectors 121 to external terminals is omitted from FIG. 10*a* for purposes of clarity and because any of various connection methods may be employed within the scope and spirit of the present disclosure which are consistent with the schematics of FIGS. 9*a* and 9*b*.

Figure 10B:
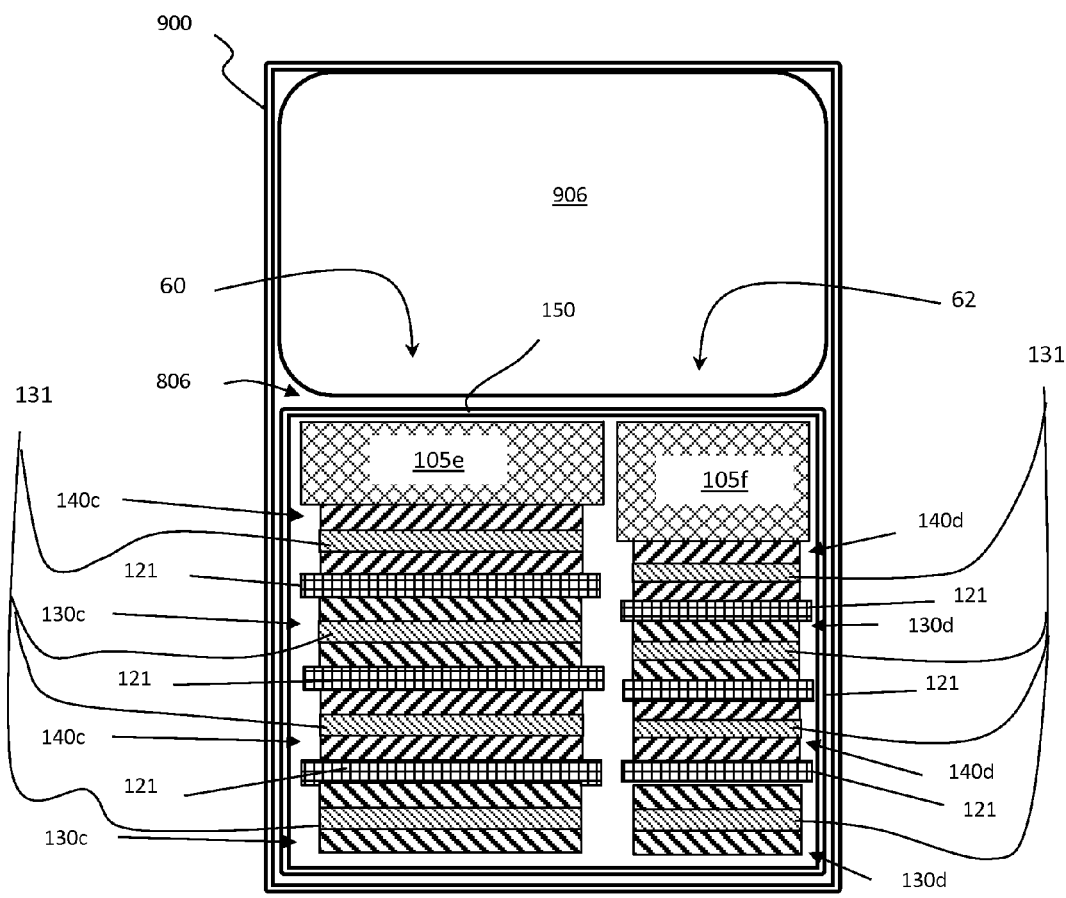
FIG. 10b is a side elevation schematic cross-sectional view of another battery according to another embodiment of the present application wherein inert inserts are disposed above an electrode assembly.

Referring to FIG. 10*b*, an embodiment of a battery 806 of the present disclosure, which is applicable to the battery configurations of FIGS. 9*c* and 9*d*, and which is constructed to address the power requirements of an electronics module 906 is shown. The split electrodes, 74 and 75, are shown embodied as anode electrodes, 130*c* and 130*d*, for exemplary and not limiting purposes. The other electrodes, 76 and 77, are respectively embodied as the cathode electrodes 140*c* and 140*d*. Of course, the disposition of cathodes and anodes may be reversed. The separator 86 is embodied as the separators 121 which are depicted as discontinuous across cells of the battery 706, but could also be continuous as implied in FIGS. 9*a*-9*d*. The inert insert 105*e* is provided in a stack of a high power rate cell 60 and the inert insert 105*f* is used in a stack of a low power rate cell 62. Illustration of electrical connections of the current collectors 121 to external terminals is omitted from FIG. 10*b* for purposes of clarity and because any of various connection methods may be employed within the scope and spirit of the present disclosure which are consistent with the schematics of FIGS. 9*a* and 9*b*.

Figure 11:
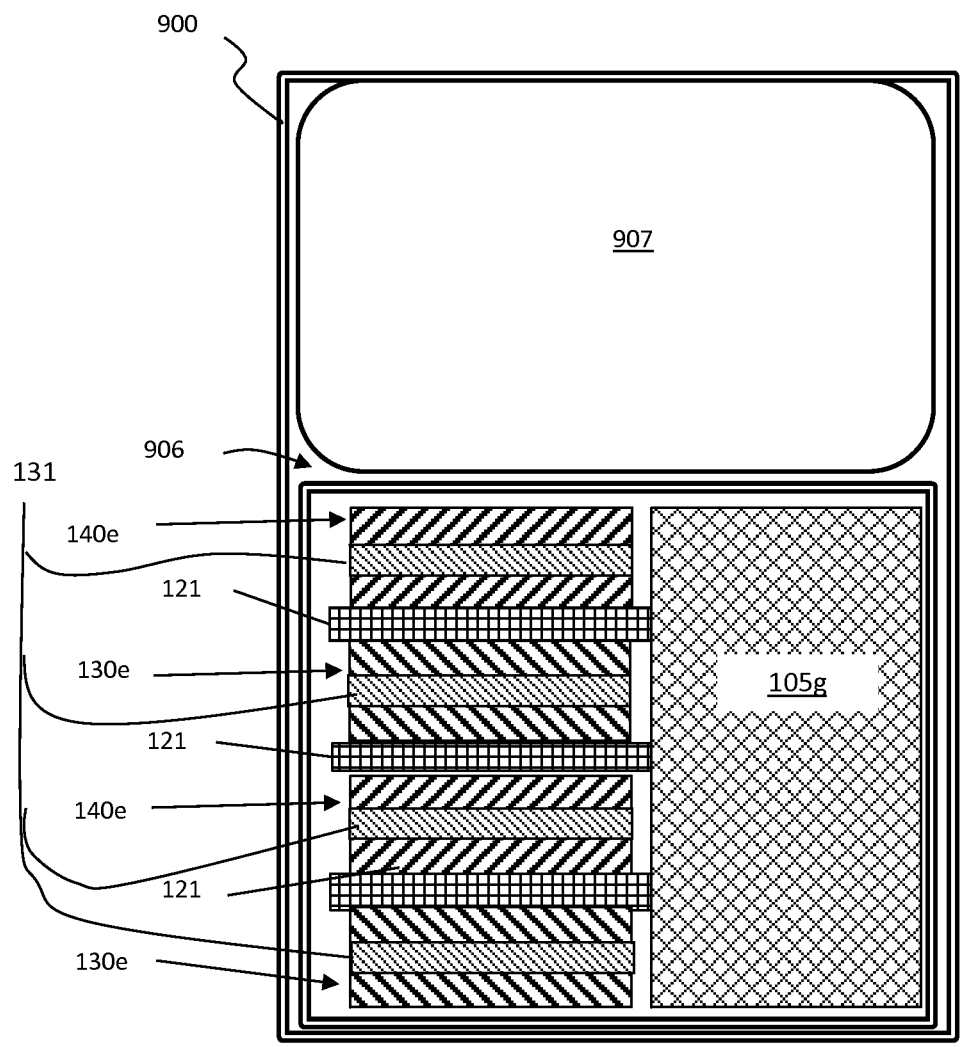
FIG. 11 is a side elevation schematic cross-sectional view of another battery according to another embodiment of the present application wherein an inert inserts is disposed adjacent an electrode assembly.

Referring to FIG. 11, a further embodiment of the present disclosure includes a battery 906 having a stack of anode electrodes 130*e*, separator 121, and cathode electrodes 140*e* having a width less than the interior of the battery case 150. An inert insert 105*g* is use to fill the space and stabilize the stack. Reducing the stack width decrease the current delivery capability, which along with a reduced energy capacity may increase or decrease operational life which depends in part on the current drain of the electronics module 907. It is further understood that the stack of anode electrodes 130*e*, separator 121, and cathode electrodes 140*e*, can also be concurrently reduced in height and a further inert insert used to compensate for the height reduction. It should also be understood that the further inert insert may either be separate from the inert insert 105*g* or may be integrated with the inert insert 105*g*.

In the foregoing embodiment, the inert inserts are optionally formed of an electrically insulating material which is inert so that adverse reactions with the electrodes and electrolyte included as a solution with the electrodes or included as a solid state electrolyte embedded in separators. Suitable materials include, but are not limited to: polyethylenetetrafluoroethylene, ceramics, non-woven glass, glass fiber material, polypropylene, and polyethylene. Alternatively, there are situations wherein the inert inserts may be formed of conductive materials such as when inert insert is positioned either at the top or bottom of the stack and forms an electrical connection to any of the battery case, feedthroughs or other terminals such as button terminals commonly used in coin type batteries. The conductive material should not adversely react with the electrodes or electrolyte. In such situations when electrical contact is made to the anode electrodes, suitable materials of composition include, but are not limited to, stainless steel, nickel, titanium, or aluminum.

Having described preferred embodiments of this disclosure with reference to the accompanying drawings, it is to be understood that this disclosure is not limited to those precise embodiments, and that various changes and modifications may be effected therein by one skilled in the art without departing from the scope or spirit of this disclosure as defined in this disclosure and the appended claims. Such modifications include substitution of components for components specifically identified herein, wherein the substitute components provide functional results which permit the overall functional operation of the devices and methods of this disclosure to be maintained. Such substitutions are intended to encompass presently known components and components yet to be developed which are accepted as replacements for components identified herein and which produce results compatible with operation of the devices and methods of this disclosure.

In summary, it will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method of standardizing a battery encasement of at least two batteries having differing battery characteristic combinations comprised of current delivery capability, voltage delivery capability, and energy capacity, the batteries each having an electrode assembly comprising at least one anode and one cathode and a separator interposed therebetween, the method comprising:
providing first electrode assemblies having a first dimension corresponding to a first battery characteristic combination of energy capacity, current delivery capability, and voltage delivery capability;
providing battery cases having a common configuration defining an electrode cavity for securely accommodating said first electrode assembly, the battery cases each being configured to be implanted within a body of a human patient;
providing second electrode assemblies having a second dimension, less by a given amount from said first dimension, corresponding to a second battery characteristic combination of energy capacity, current delivery capability, and voltage delivery capability, said second battery characteristic combination differing from said first battery characteristic combination;

disposing individual ones of said first electrode assemblies respectively into said electrode cavities of individual ones of said battery cases to produce a first battery type;

disposing individual ones of said second electrode assemblies respectively into said electrode cavities of other individual ones of said battery cases and disposing an inert insert into said electrode cavities of said other individual ones of said battery cases to produce a primary cell battery defining a second battery type, said inert spacer being dimensioned to compensate for said given amount to securely accommodate said second electrode assemblies in said electrode cavities of said other individual ones of said battery cases; and coupling an electronics module to each of said battery types, said electronics modules having different power supply requirements.

2. The method of claim 1, wherein said disposing said inert spacer includes disposing said inert spacer in a bottom of said electrode cavity and disposing said second electrode assembly on top of said inert spacer.

3. The method of claim 2, wherein anodes and cathodes of the second electrode assembly are thinner than anodes and cathodes of the first electrode assembly.

4. The method of claim 2, wherein anodes and cathodes of the second electrode assembly are fewer in number than anodes and cathodes of the first electrode assembly.

5. The method of claim 1, wherein said disposing said inert spacer includes disposing said second electrode assembly on a bottom of said battery case and disposing said inert spacer on top of said second electrode assembly.

6. The method of claim 5, wherein anodes and cathodes of the second electrode assembly are thinner than anodes and cathodes of the first electrode assembly.

7. The method of claim 5, wherein anodes and cathodes of the second electrode assembly are fewer in number than anodes and cathodes of the first electrode assembly.

8. The method of claim 1, wherein:

said second electrode assembly has a first plate assembly and a second plate assembly, and said disposing said inert spacer includes disposing said first plate assembly on a bottom of said battery case, disposing said inert spacer on top of said first plate assembly, and disposing said second plate assembly on top of said inert spacer.

9. The method of claim 8, wherein anodes and cathodes of the second electrode assembly are thinner than anodes and cathodes of the first electrode assembly.

10. The method of claim 8, wherein anodes and cathodes of the second electrode assembly are fewer in number than anodes and cathodes of the first electrode assembly.

11. A method of producing a product line, comprising:

producing electronics modules, respectively having power requirements differing from one another;

producing a plurality of a common encasement having a battery compartment and an electronics compartment, the electronics compartment being configured to accept any of the electronics modules, said plurality of said common encasement being configured to be implanted within a body of a human patient;

providing electrode assemblies each comprising at least one pair of an anode and a cathode with a separator disposed therebetween, said electrode assemblies being respectively configured to match said differing power requirements of said electronics modules such that some of said electrode assemblies have dimensions differing from other ones of said electrode assemblies;

inserting said electronics modules respectively into the electronics compartment of a corresponding number of said plurality of said common encasement; and for each of said corresponding number of said plurality of said common encasement, selecting one of said electrode assemblies to match a power requirement of said electronics module inserted in the common encasement, inserting the selected one of said electrode assemblies into said battery compartment to form a primary cell battery, and inserting an inert insert into said battery compartment so as to fill said battery compartment to an extent necessary to prevent displacement of said stack.

12. A method according to claim 11, wherein said battery compartment is integral with said common encasement.

13. A method according to claim 11, wherein said battery compartment is separate from said common encasement and is a battery case adapted to fit inside said common encasement.

14. A method according to claim 11, wherein at least one of said electronics modules is a circuit board.

15. A method according to claim 11, wherein at least one of said electronics modules is a circuit board disposed in a housing.

16. A method according to claim 11, wherein said anodes and said cathodes of said electrode assemblies differ in size from each other.

17. A method according to claim 11, wherein said electrode assemblies have differing numbers of said anodes and said cathodes.

18. The method of claim 1, further comprising positioning one of said battery types and one of said electronics modules within an encasement of an implantable medical device.

19. The method of claim 18, wherein said one of said electronics modules controls one or more sensing and stimulation functions of said implantable medical device and said one of said battery types charges a capacitor of said one of said electronics modules controls.

20. The method of claim 1, wherein said inert spacer is formed from a conductive material such that said inert insert forms an electrical connection to said battery case of said second battery type, said conductive material being selected from a group consisting of stainless steel, nickel, titanium, and aluminum.

* * * * *